United States Patent [19]

Moody

[11] 4,243,084
[45] Jan. 6, 1981

[54] DOOR SIZING MACHINE

[75] Inventor: Jack M. Moody, Milwaukie, Oreg.

[73] Assignee: Cranston Machinery Co., Inc., Oak Grove, Oreg.

[21] Appl. No.: 60,992

[22] Filed: Jul. 27, 1979

[51] Int. Cl.³ .............................................. B27B 5/00
[52] U.S. Cl. ................................... 144/39; 144/326 R
[58] Field of Search ................... 83/408; 144/39, 1 R, 144/3 E, 326 R

[56] References Cited

U.S. PATENT DOCUMENTS

| | | | |
|---|---|---|---|
| 2,931,401 | 4/1960 | Lambert | 83/408 X |
| 3,538,967 | 11/1970 | Hensley | 144/3 R |
| 3,540,498 | 11/1970 | Woloveke et al. | 144/3 R X |
| 3,788,174 | 1/1974 | Morse | 83/408 X |

Primary Examiner—Willie G. Abercrombie
Attorney, Agent, or Firm—Lee R. Schermerhorn

[57] ABSTRACT

Starting from a loading position, a door carriage moves a door sideways between a pair of saws to trim the ends of the door. Then the carriage remains stationary while a pair of planer heads move across the carriage to trim the side edges of the door. Finally, in a lower path of travel, the carriage returns to its loading position for unloading the door, with the door passing with clearance under the saws. During these operations the door is secured by a vacuum table on the carriage.

12 Claims, 13 Drawing Figures

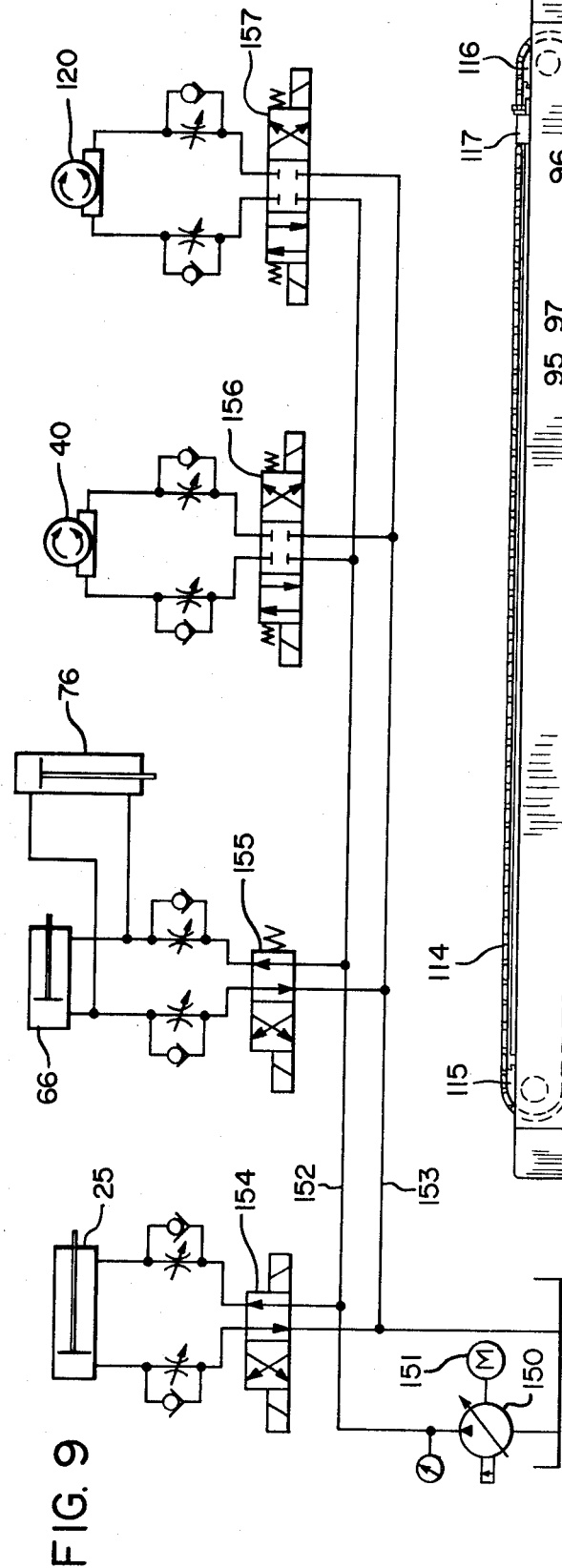
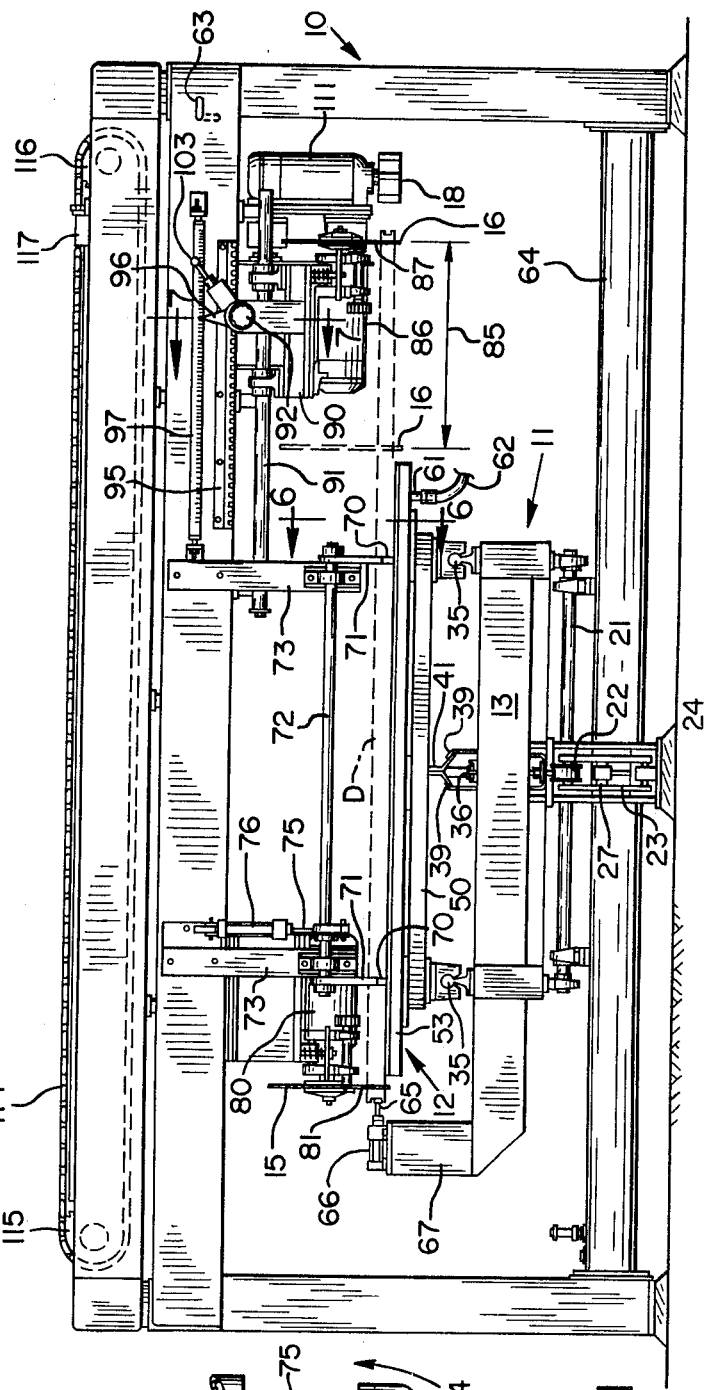
FIG. 9
FIG. 6
FIG. 1

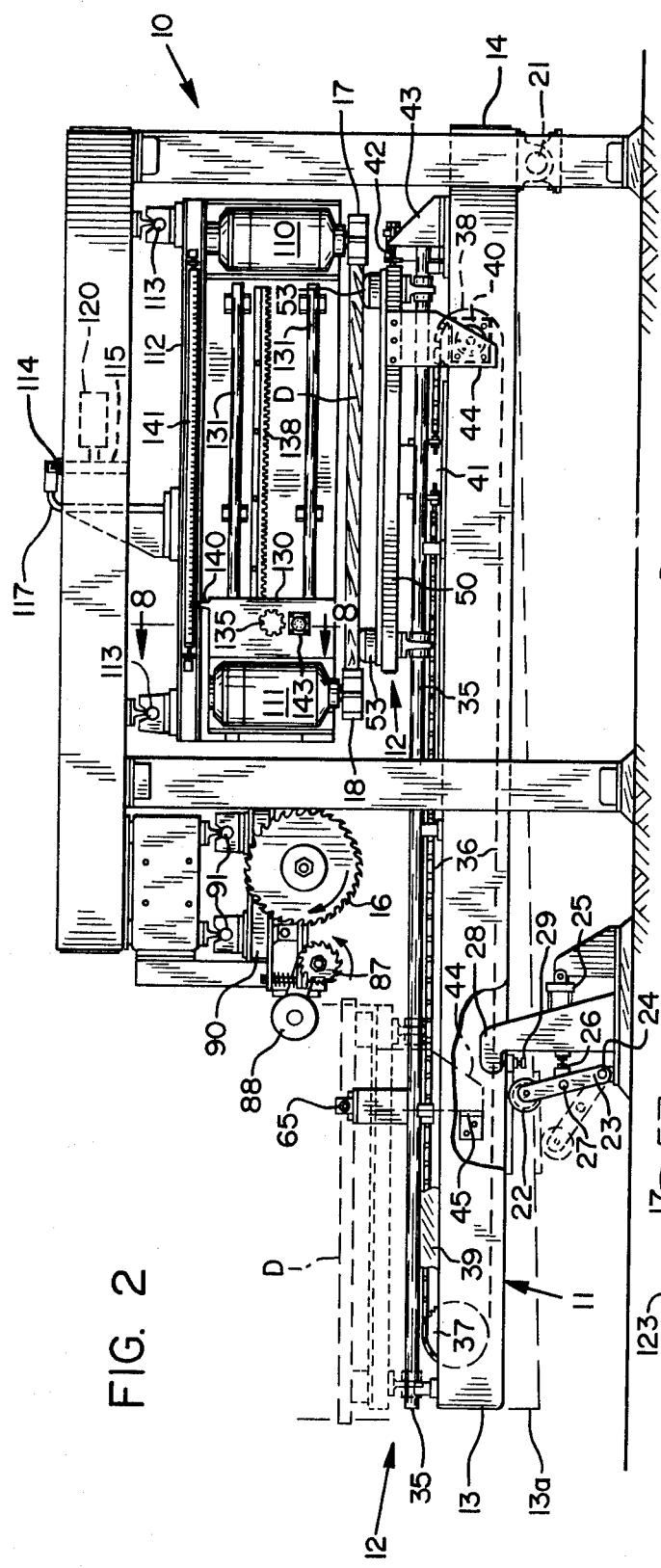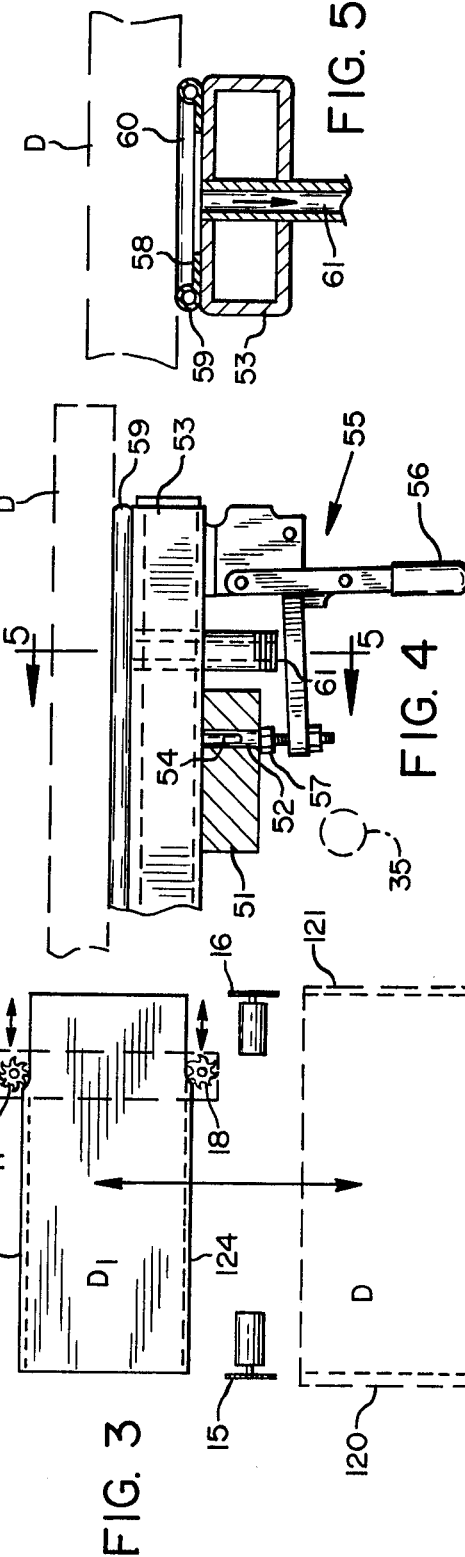

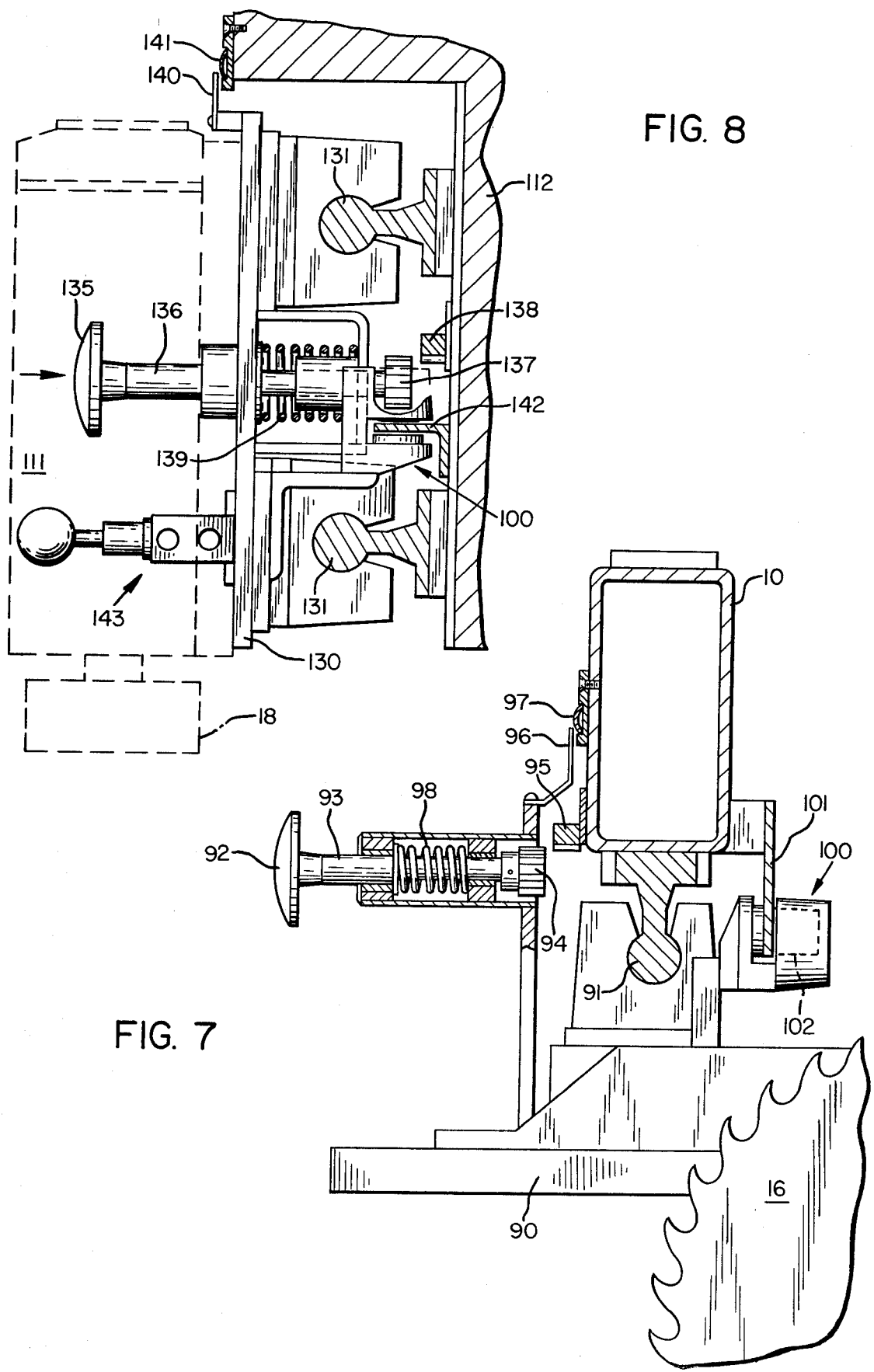

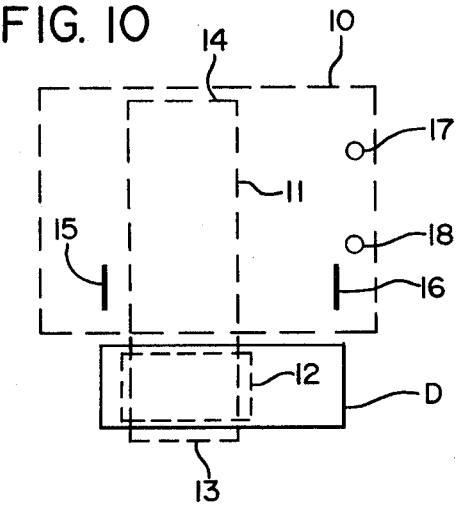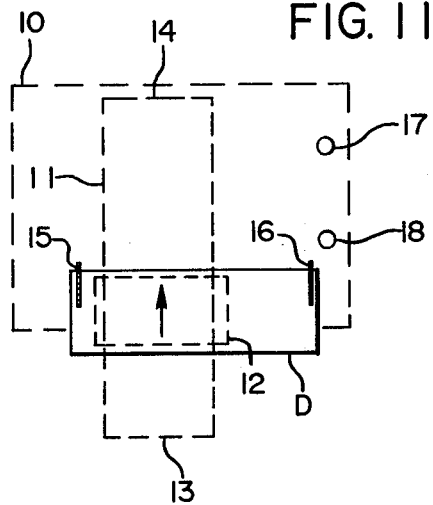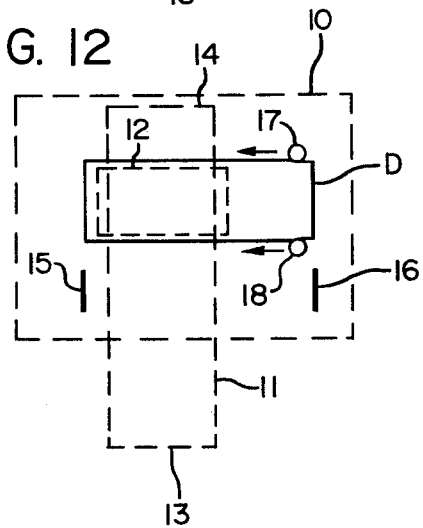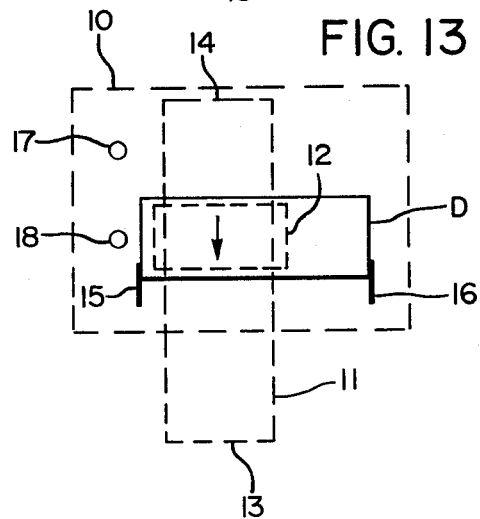

DOOR SIZING MACHINE

BACKGROUND OF THE INVENTION

This invention relates to a machine for trimming the ends and sides of doors to accurate predetermined dimensions.

There is a need in the industry, particularly by small door manufacturing plants, for a relatively compact and efficient machine for sizing doors to certain predetermined dimensions required by the customers. Such a machine has different requirements from those of plants with high volume production capable of maintaining a continuous work flow thru the sizing machine. For the present purpose the sizing machine must often occupy a limited operating space and be quickly and easily adjustable for doors of different sizes where there may not be a long production run of a single size of door.

Large door manufacturing plants also have need for such a machine to alleviate the problem of making the tedious adjustments of their high speed sizing machines for short runs of odd size doors. By providing a special machine for such purposes the conventional high speed machine can actually increase daily production.

Further objects of the present invention are to provide a door sizing machine of the type described wherein the trimmed door is returned to the input side of the machine so that the manual feeding and discharging of the door product are performed by the same personnel, to provide a machine in which the door itself is moved in one direction to trim the ends and then a portion of the machine is moved across the door to trim the edges while the door is held stationary, to provide quick and easy adjustments for varying the dimensions of the finished product, to provide a machine requiring a minimum of floor space and to provide a machine which may be installed in an out of the way corner of a building or up against other machinery.

SUMMARY OF THE INVENTION

The present machine combines two patterns of movements of the product and machine parts. In a first step of the operation the door itself is moved transversely in one direction to trim its ends. Then a portion of the machine is moved longitudinally across the door while the door is held stationary, to trim the edges.

This prevents having to move the door in two directions and allows the door to return to its loading point, thereby providing simplicity of design since the door is required to move only forward and back in one direction. By returning the product to its loading point the same workmen perform both functions of loading and unloading, an additional advantage being that space is not required on the opposite side of the machine for workflow out of the machine.

An important feature of the machine which makes these advantages possible is the mechanism for locating and retaining the product in precise position for precision trimming. Locating stops or dogs are actuated at one side and one end of the door to accurately position the door on a vacuum table on a door carriage. The door is then held securely in such adjusted position by vacuum. All conventional clamping devices and their necessary adjustments are eliminated and there are no obstructions at the ends or sides of the door which are to be trimmed.

The carriage moves the door between two end trimming saws and then the carriage and door are held stationary while a planer assembly moves in a direction transverse to the direction of carriage movement to trim the sides of the door. Quick and easy adjustments are provided for one saw and one planer head to trim the doors accurately to given dimensions.

In order to prevent damage to the door ends by again passing through the end trim saws while returning to the loading position a vertical separation is established between the door and the saws. The desired vertical separation is accomplished by the downward pivoting of the front or loading end of the carriage track during the return movement allowing the door to return at a distance under the saws.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 1 is a front elevation view of a door trim machine embodying the invention.

FIG. 2 is a side elevation view.

FIG. 3 is a diagramatic plan view showing the relative positions of the end trim saws and side planer heads.

FIG. 4 is a fragmentary sectional view of a portion of the door carriage and vacuum table.

FIG. 5 is a view on the line 5—5 in FIG. 4.

FIG. 6 is a view on the line 6—6 in FIG. 1.

FIG. 7 is a view on the lines 7—7 in FIG. 1.

FIG. 8 is a view on the line 8—8 in FIG. 2.

FIG. 9 is a schematic diagram of the hydraulic system.

FIGS. 10–13 are diagramatic plan views illustrating the sequence of operations of the machine.

DESCRIPTION OF THE PREFERRED EMBODIMENT

The functions of the machine will first be described with reference to FIGS. 10–13. The machine frame 10 contains a horizontal forwardly extending rail assembly 11 for a carriage 12. Rail assembly 11 has a front end 13 projecting forward from the machine frame 10 and a back end 14 mounted on a horizontal pivot which allows the front end to be depressed from horizontal position.

FIG. 10 illustrates the loading position wherein a door D has been placed on carriage 12 at the front end of rail assembly 11. FIG. 11 illustrates the first operation wherein the carriage and door are moved rearward on rail assembly 11 causing both ends of the door to be trimmed by a pair of end trim saws 15 and 16.

In FIG. 12 the carriage and door are held stationary at the back end of rail assembly 11 and a pair of planer heads 17 and 18 are moved transversely across rail assembly 11 to trim both side edges of the door. When the planing operation has been completed the carriage and door move forward toward the front end of rail assembly 11 as shown in FIG. 13.

During the return movement of the door in FIG. 13 the front end 13 of rail assembly 11 is lowered so that the door will pass with clearance under the saws 15 and 16 to avoid damage to the trimmed ends. This return movement brings the door and carriage to an unloading position which is the same as the loading position. The front end of rail assembly 11 is raised back to horizontal position and planer heads 17 and 18 are returned to their starting positions whereby all the elements are restored to their original positions in FIG. 10. When the door has been removed from carriage 12 the machine is ready to start a new cycle of operations on another door.

The present machine is not limited to the trimming of doors but is useful for trimming any other similar panels having hollow or solid wooden cores between a pair of flat face sheets which are usually plywood.

Referring now to FIG. 2 for the details of construction of the machine, the back end 14 of carriage rail assembly 11 is supported on a transverse horizontal pivot shaft 21 to provide for dropping the front end 13 to a lower position at 13A as described above. To effect such vertical movement the front end portion of rail assembly 11 is supported on a roller 22 on the upper end of an upstanding pivot arm 23 on a horizontal pivot 24. Arm 23 is swung between solid line and broken line positions by a hydraulic cylinder 25 having a piston rod 25 pivotally connected to the arm at 27.

Upward movement of rail assembly 11 is limited by a stationary stop 28 which is engaged by an ajustable stop screw 29 on the rail assembly. This upper position as shown in solid lines is the horizontal loading and unloading position of the rail assembly as described above. In this position carriage 12 moves the door D through saws 15 and 16 to trim the ends of the door. In the return movement of the carriage the front end of the rail assembly drops down to position 13A causing the door to pass with clearance under the saws.

Door carriage 12 rides on linear ball bushings on a pair of guide shafts 35 on rail assembly 11 driven by an endless chain 36 trained around an idler sprocket wheel 37 and a driving sprocket wheel 38. Sprocket wheel 38 is driven by an hydraulic motor 40. The opposite ends of chains 36 are connected to a bracket plate 41 on the under side of carriage 12. The upper reach of chain 36 is shielded from sawdust and other debris by a cover having a pair of upstanding rubber lips 39 (FIG. 1) which press against each other to form a hood over the chain. Plate 41 deflects these lips apart as the carriage moves in its path of travel.

Inward movement of carriage 12 is stopped by a shock absorber bumper 42 mounted on a bracket 43 on rail assembly 11 as shown in the solid line position of carriage 12 in FIG. 2. Outward movement of the carriage is stopped by arms 44 on the carriage which engage stops 45 on the rail assembly as shown in the broken line position of the carriage.

Carriage 12 has a rectangular frame 50 with a pair of opposite side members 51 parallel with the guide rails 35 as shown in FIG. 4. Each side member 51 contains a series of holes 52 for positioning a pair of spaced apart vacuum cup bars 53 in appropriate positions to support the door D, according to the width of the door, the lengthwise direction of the door being parallel with the bars 53 and transverse to the guide rails 35. The opposite ends of bars 53 are equipped with downward projecting pins 54 for insertion in appropriate holes 52 for the desired spacing of the two bars 53. A conventional manual clamp mechanism 55 having an overcenter toggle action operable by a handle 56 has an adjustable screw 57 to engage the underside of frame member 51 and clamp the bar 53 to the carriage frame 50.

Adhesively secured to the top side of each bar 53 is a pair of rubber strips 58 each having a marginal raised bead 59 preferably in the form of a hollow tube as shown in FIG. 5. The two strips 58 are joined together at their opposite ends to form a vacuum cup or chuck 60 which supports the under face of the door D. When air is exausted through the suction connections 61 in the two bars 53 the door is held in fixed position on carriage 12. Thus the two bars 53 on carriage 12, with their vacuum cups 60, form a vacuum table on the door carriage.

Suction connections 61 are connected through a flexible tube 62 and a manual valve 63 with vacuum tank 64 in FIG. 1. When the valve handle at 63 is turned to broken line position the three way porting of the valve shuts off the source of vacuum and admits atmospheric pressure to vacuum cups 60 to release the door.

In the loading position described above with reference to FIG. 10 the door is accurageły positioned in a lengthwise direction on carriage 12 by the retractable and adjustable end stop 65 in FIG. 1. Stop 65 is a piston rod in a horizontal hydraulic cylinder 66 mounted on the upstanding end 67 of a transverse arm extending laterally from one side of the carriage rail assembly 11.

Referring now to FIGS. 1 and 6 the lateral position of the door on carriage 12 is accurately determined by a pair of retractable and adjustable stops 70 arranged to engage one side edge of the door. Each stop 70 is carried by an arm 71 on shaft 72 mounted in bearings on the lower ends of a pair of vertical members 73 supported by an upper part of the frame 10. Stop arms 71 are rotated through about 90° by a crank arm 74 on the shaft 72 actuated by a piston rod 75 in an hydraulic cylinder 76. Stops 70 engage the rear side of the door D as viewed from the front in FIG. 1.

Stops 65 and 70 are normally in retracted positions. When a door is placed on carriage 12 these stops are extended as shown in FIGS. 1 and 6 to shift the door into predetermined position on the two vacuum cups 60. Thus the stops 65 and 70 operate as locating dogs. Then suction is applied to suction connections 61 securing the door in adjusted position on the vacuum table of the carriage and the stops 65 and 70 are retracted, leaving the four edges of the door accessible for the end and side trimming operations.

End trim saw 15 in FIG. 1 is mounted in stationary position on the left vertical member 73 on main frame 10. This saw is driven by an electric motor 80 and is preceded by a small scoring wheel 81 which cuts a shallow groove in the surface veneer ahead of saw 15 so that the latter will not splinter and mar the surface veneer on the forward side of the saw where the teeth are moving in an upward direction.

Saw 16 has a range of movement longitudinally of the door as indicated by the dimension line 85 in FIG. 1 for adjustment to trim doors of different lengths. This saw is driven by an electric motor 86 and is preceeded by a scoring disc 87 which is driven by a separate electric motor 88 as seen in FIG. 2. The previously mentioned scoring wheel 81 is similarly driven by a separate electric motor, not shown.

Saw 16, motor 86, scoring wheel 87 and motor 88 are mounted on a saw carriage 90 which is movable manually on linear ball bushings on a pair of horizontal guide shafts 91 to provide the adjustment indicated at 85 in FIG. 1. Fine adjustment is provided by a knob 92 mounted on a shaft 93 in the carriage, which shaft has a pinion 94 on its inner end engageable with the teeth of a rack bar 95 on the frame 10 as shown in FIG. 7. Adjustment to a specified length of door is facilitated by a pointer 96 on the carriage 90 which moves along a scale 97 on the frame 10. A compression spring 98 on the shaft 93 normally holds pinion 94 disengaged from rack 95 as shown. To make the described fine adjustment, knob 92 is pushed inward to engage pinion 94 with the rack 95 and then the knob 92 is rotated to shift the carriage 90 as necessary.

After fine adjustment in the manner described the carriage 90 and saw 16 are locked in adjusted position by the caliper disc brake 100 in FIG. 7. This is similar to the disc brakes used with automobile wheels but instead of clamping a rotating disc it clamps an elongated stationary fin 101 on the frame 10. A pneumatic piston 102 in the brake is extended by air pressure under the control of the manual valve 103 adjacent to the knob 92.

In FIG. 2 the planer head 17 is driven by an electric motor 110 and the planer head 18 is driven by an electric motor 111, these being the major elements in a planer assembly on a carriage 112. Carriage 112 is mounted on linear ball bushings for travel on a pair of overhead guide shafts 113 which are transverse to the guide shafts 35 for the door carriage 12. Guide shafts 113 are suspended from the upper part of main frame 10. As shown in FIG. 1 chain 114 is trained around a drive sprocket 115 and an idler sprocket 116, the former being driven by hydraulic motor 120 in FIG. 2. The ends of chain 114 are connected to an upstanding bracket 117 on carriage 112.

The sequence of operations performed on the door was described in a general way with reference to FIGS. 10-13. More explicitly, in FIG. 3, D indicates the starting and ending position of the door which was referred to in FIG. 10 as the loading and unloading position. In FIG. 3 the door is moved from position D to D₁ by the carriage 12 in FIGS. 1 and 2 causing the end trim saws 15 and 16 to trim off end strips at 120 and 121 according to the adjustment of pointer 96 on scale 97 in FIGS. 1 and 7.

Then the door remains stationary in position D₁ in FIG. 3 and planer carriage 112 moves the planer heads 17 and 18 to the left, removing the rough opposite edge portions 123 and 124 to a controlled depth as will presently be described. When this operation is complete, planer heads 17 and 18 remain temporarily to the left of the door in position D₁ and the door is returned to position D passing with clearance under the saws 15 and 16.

The adjustment for determining the width of the finished door will now be described. Planer head 17 and its motor 110 are mounted in a fixed position on planer carriage 112. As shown in FIGS. 2 and 8 the planer head 18 and its motor 111 are mounted on a carriage 130 which is manually movable on linear ball bushings on a pair of guide shafts 131 which are transverse to the guide shafts 113 and parallel with the guide shafts 35.

Fine adjustment of the position of carriage 130 and planer head 18 is obtained by pushing in a knob 135 on a shaft 136 which has a pinion 137 on its inner end to engage the teeth of toothed rack bar 138 on carriage 112, and then rotating the knob. Compression spring 139 normally holds the pinion out of engagement with the rack as shown. The door width dimension is indicated by the position of pointer 140 on carriage 130 with respect to a scale 141 on the carriage 112. Carriage 130 and planer head 18 are held in adjusted position by caliper disc brake 100 on carriage 130 which clamps a linear fin 142 on carriage 112 under the control of manual air valve 143.

FIG. 9 is a schematic diagram of the hydraulic system for operating the various hydraulic units described above. Pump 150 is driven by an electric motor 151 to supply a pressure line 152, the line 153 being a relief or discharge line leading back to the pump. Lift cylinder 25 for the carriage rail assembly 11 in FIG. 2 is controlled by a two position four-way double solonoid valve 154.

Door stop actuating and retracting cylinders 66 and 76 in FIG. 1 are controlled by a two position four-way spring return single solonoid valve 155. Reversible hydraulic motor 40 which drives carriage 12 in FIG. 2 is controlled by a three position four-way double solonoid valve 156 and reversible hydraulic motor 120 in FIG. 2 which drives the planer assembly carriage 112 is controlled by a similar valve 157.

These solonoid valves are in turn controlled by an electrical control system, not illustrated, as will readily be understood by persons skilled in the art. Such control system is preferably arranged to provide both an automatic mode of operation and a manual mode of operation. However even in the automatic mode of operation certain steps are preferably controlled manually by push buttons or valve handles such as the starting of pump motor 151, the actuation and retraction operations of stop cylinders 66 and 76 and the opening of a vacuum valve to hold the door on the vacuum table on carriage 12.

In the automatic mode of operation the solonoid valves 156, 157 and 154 are actuated in automatic sequence to move the door between saws 15 and 16 for trimming the ends, to stop the door at the limit of this movement, to advance the planer assembly carriage 112 for trimming the sides of the door and then stop said carriage at its limit of movement, to lower the front end of carriage rail assembly 11 and return the carriage forward to unloading position, to stop the movement of the carriage in unloading position, raise the front end of carriage rail assembly 11 and return planer assembly carriage 112 to its starting position. Suitable limit switches stop the movements of door carriage 12 and planer assembly carriage 112. Finally, the vacuum valve is closed manually to break the seal holding the door on carriage 12.

In the manual mode of operation each of the above automatic functions is individually controlled manually by a separate push-button switch. The machine may be operated entirely in the manual mode if desired but the main reason for providing a manual mode of operation is to allow the operator to complete a machine cycle in the event that the automatic cycle is interrupted for some reason.

What is claimed is:

1. A door sizing machine comprising a door carriage mounted for travel on a horizontal carriage rail assembly, means for moving said carriage from a front end to a back end of said rail assembly between a pair of end trim saws to trim the ends of a door on said carriage, a planer assembly at said back end of said rail assembly, means for moving said planer assembly transversely across said rail assembly to trim the sides of said door, means for producing a vertical separation between said saws and the return path of travel of said door on said carriage so that the door and carriage may be returned to said front end of said rail assembly without engaging said saws, and means for returning said carriage to said front end of said rail assembly with the door passing clear of the saws.

2. A machine as defined in claim 1, said trim saws and planer assembly being above the level of said carriage, and means for lowering at least the front end of said rail assembly to produce said vertical separation between said saws and the door during said return movement.

3. A machine as defined in claim 2, said back end of said rail assembly being mounted on a transverse horizontal pivot for lowering said front end.

4. A machine as defined in claim 3 including an upstanding pivot arm having a roller on its upper end to support said front end of said rail assembly, and a hydraulic cylinder having a piston rod connected with said arm to lower and raise said front end.

5. A machine as defined in claim 1 including a vacuum table on said carriage for holding the door in fixed position on the carriage.

6. A machine as defined in claim 5, said vacuum table comprising a pair of parallel support bars arranged to underlie the door, a pair of parallel rubber strips on each bar having tubular portions to provide resilient supports for the under face of the door and form an elongated vacuum chamber between said bar and said under face of the door, and an air suction connection in said bar between said tubular portions of said strips.

7. A machine as defined in claim 6, said support bars extending lengthwise of the door and being supported on bars in said carriage transverse to the length of the door, a series of holes in said transverse bars, vertical pins on the under side of one of said support bars insertable in selected ones of said holes to vary the spacing of said two support bars according to the width of the door, and means to clamp said one support bar to said transverse bars with said pins in said holes.

8. A machine as defined in claim 5 including a locating stop mounted at one side of said front end of said rail assembly to engage one end of the door on said vacuum table, locating stops arranged to engage one side of a door on said table, and actuating means for positioning and retracting said stops, leaving all four edges of the door accessible for said trimming operations.

9. A machine as defined in claim 8 said door side stops being mounted for swinging movement on an overhead shaft above said carriage and rail assembly, and said actuating means comprising hydraulic cylinders.

10. A machine as defined in claim 1, one of said saws being movable on a rail support toward and away from the other saw to trim doors to different lengths, said planer assembly comprising a pair of planer heads on a planer carriage having said transverse movement, and one said planer heads being movable on said planer carriage toward and away from the other planer head to trim doors to different widths.

11. A machine as defined in claims 10, said movable saw and movable planer head each being adjustable by a rack and pinion mechanism having a manual knob to rotate the pinion, an elongated fin extending along said rail support for said movable saw, an elongated fin on said planer carriage extending along the path of movement of said movable planer head, and air brakes on said movable saw and movable planer head arranged to clamp said fins and hold said movable saw and movable planer head in adjusted positions.

12. A machine as defined in claim 11, each of said rack and pinion mechanisms comprising a pinion shaft having an outer end carrying said knob and an inner end carrying said pinion, a spring normally shifting said shaft axially in an outward direction to disengage said pinion from said rack for coarse adjustment of said movable saw and movable planer head by direct manual movements thereof, each of said knobs being movable in an inward direction against the force of said spring to engage its pinion with its associated rack for fine adjustment, said air brakes comprising caliper disc type brakes.

* * * * *